Figure 1:
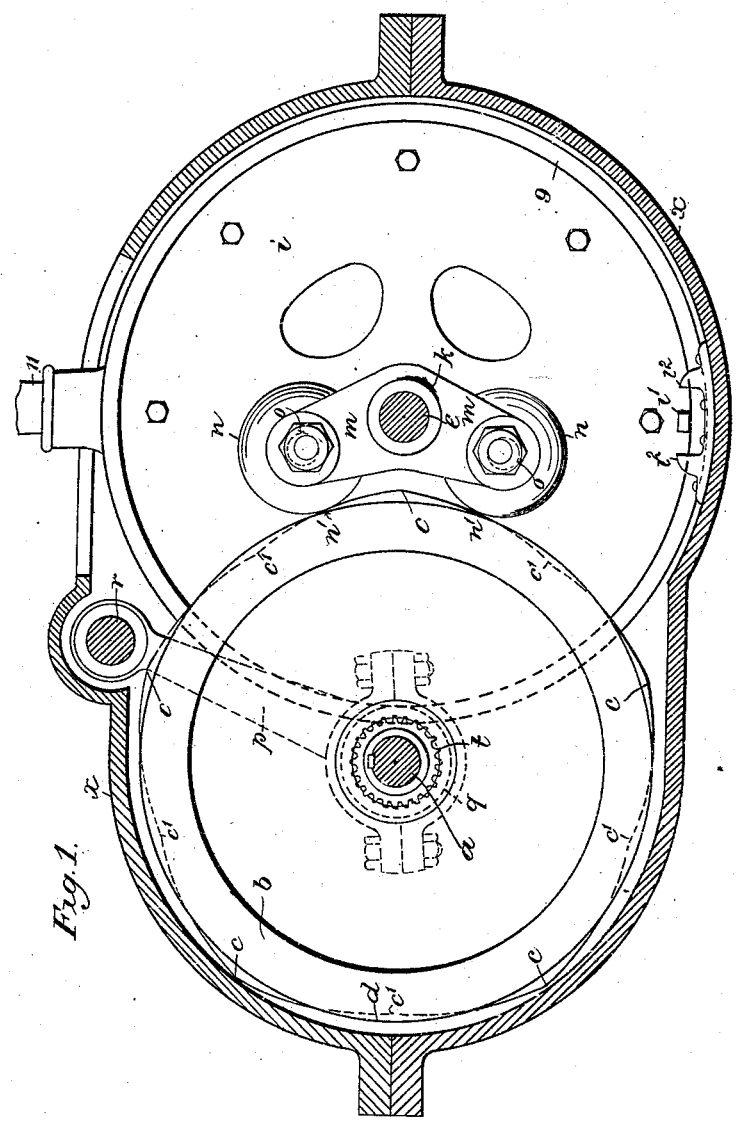

No. 843,013. PATENTED FEB. 5, 1907.
R. HAMILTON.
POWER TRANSMITTING MECHANISM.
APPLICATION FILED JAN. 15, 1906.

5 SHEETS—SHEET 1.

Witnesses.
W Henry Simms
E. Clough.

Inventor:
R. Hamilton
Attorney.

No. 843,013. PATENTED FEB. 5, 1907.
R. HAMILTON.
POWER TRANSMITTING MECHANISM.
APPLICATION FILED JAN. 15, 1906.
5 SHEETS—SHEET 2.
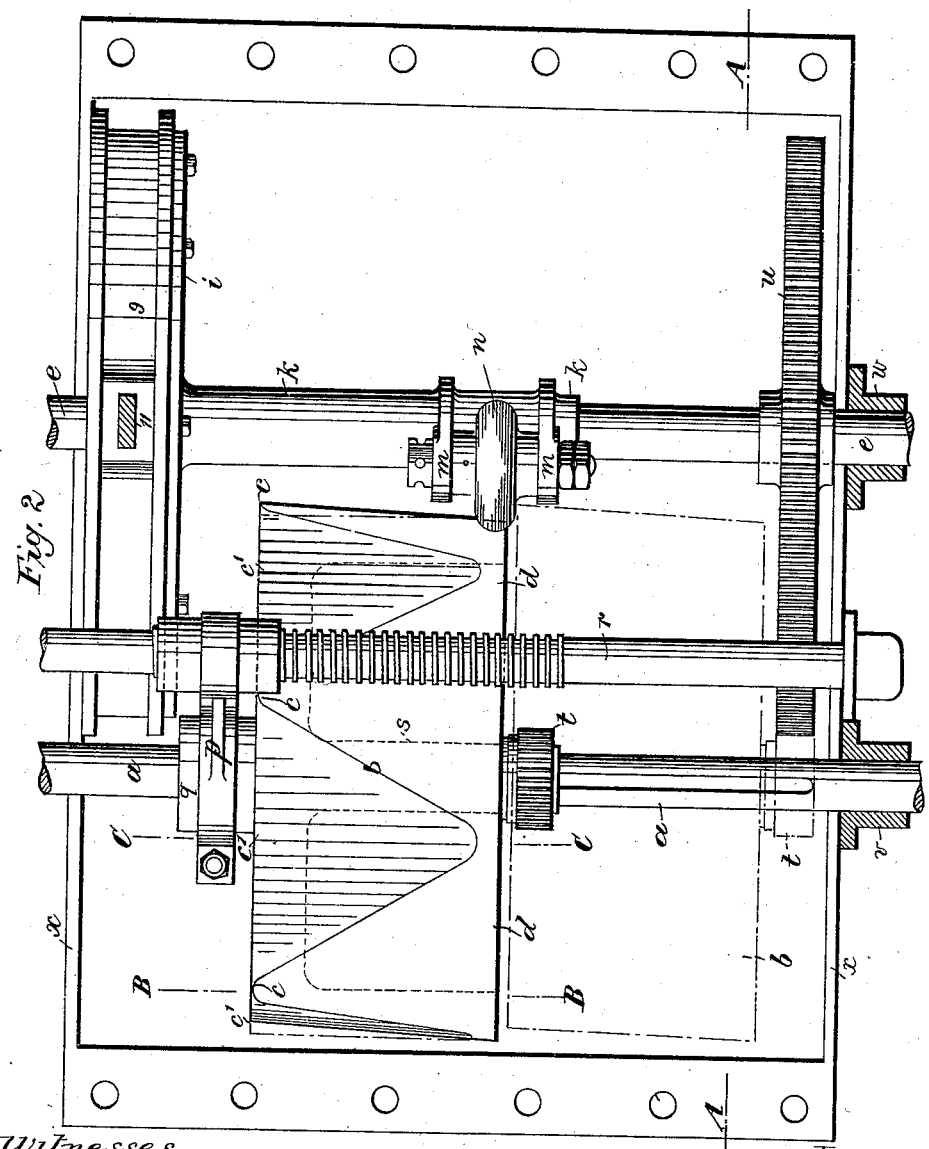

No. 843,013. PATENTED FEB. 5, 1907.
R. HAMILTON.
POWER TRANSMITTING MECHANISM.
APPLICATION FILED JAN. 15, 1906.
5 SHEETS—SHEET 3.
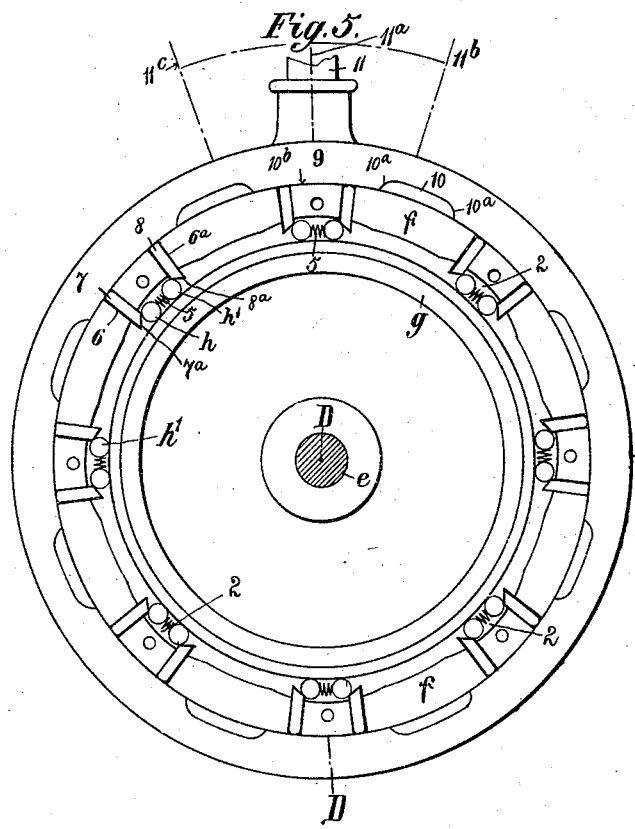
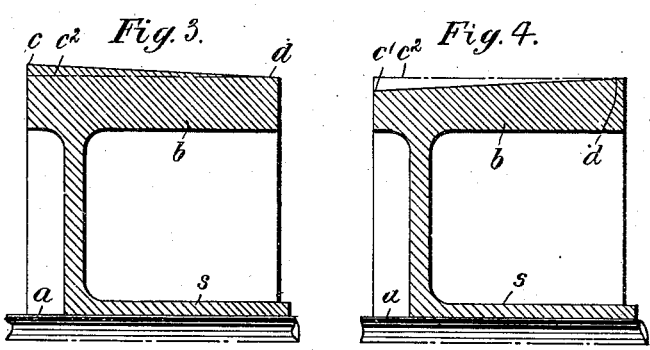

No. 843,013. PATENTED FEB. 5, 1907.
R. HAMILTON.
POWER TRANSMITTING MECHANISM.
APPLICATION FILED JAN. 15, 1906.
5 SHEETS—SHEET 4.
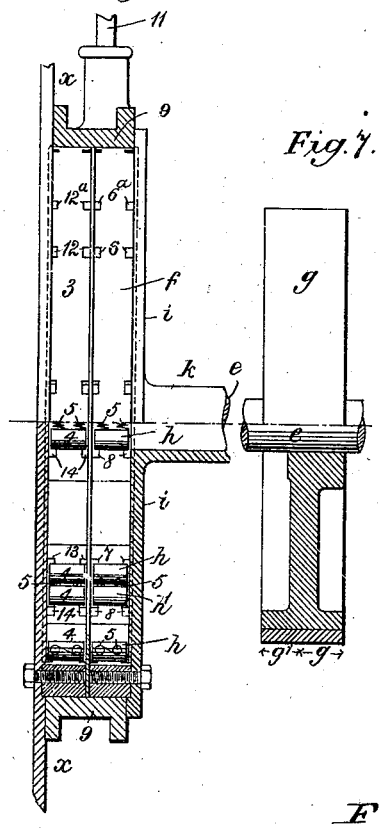
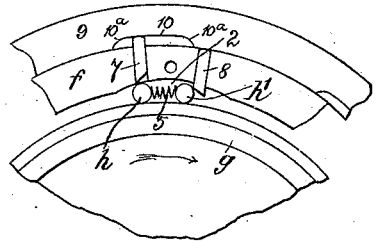
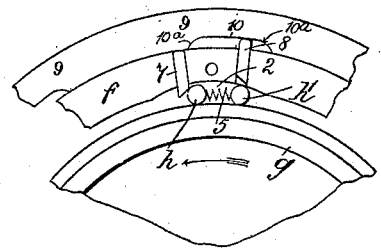
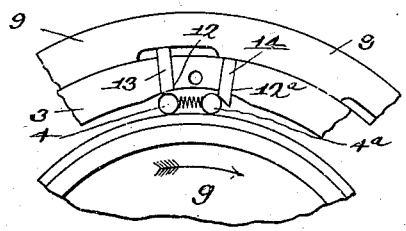
Witnesses.
W Henry Simins
E. Clough
Inventor.
R. Hamilton
Attorney
THE NORRIS PETERS CO., WASHINGTON, D. C.

No. 843,013. PATENTED FEB. 5, 1907.
R. HAMILTON.
POWER TRANSMITTING MECHANISM.
APPLICATION FILED JAN. 15, 1906.

5 SHEETS—SHEET 5.

Witnesses.
W. Henry Simins
E. Clough.

Inventor.
R. Hamilton
Attorney.

UNITED STATES PATENT OFFICE.

ROBERT HAMILTON, OF SINGAPORE, STRAITS SETTLEMENTS.

POWER-TRANSMITTING MECHANISM.

No. 843,013.　　　　　Specification of Letters Patent.　　　　Patented Feb. 5, 1907.

Application filed January 15, 1906. Serial No. 296,167.

*To all whom it may concern:*

Be it known that I, ROBERT HAMILTON, a subject of the King of Great Britain and Ireland, residing at Singapore, Straits Settlements, have invented Improvements in or Relating to Driving or Power-Transmission Mechanism Suitable for Motor-Cars and for other Purposes, of which the following is a specification.

This invention has reference to driving or power-transmitting mechanism of the kind in which rotary motion is transmitted in a rapid intermittent or step-by-step manner to a rotary body from a continuously-rotating driving-body through clutch mechanism comprising an oscillating portion, a rotary portion, and means—such, for example, as balls or rollers or pawl-and-ratchet mechanism (hereinafter referred to as "rollers")—for locking the oscillating and rotary portions of the clutch together when the oscillating portion moves in one direction; and it has for its object to so construct such mechanism that the driven body can be driven at various speeds and when desired in either direction from the driving body or be put out of driving connection with such body without interfering with the rotation of the latter body and without the use of toothed speed or reduction gearing, such as ordinarily used, and thereby to simplify the construction of mechanism of the kind referred to.

It also has for its object to enable the driven body when running at full speed to be put into gear with and be positively driven from the driving body independently of the clutch mechanism and also to provide an improved construction of driving or power-transmission mechanism of the kind herein referred to.

The invention consists for these purposes in various novel features of construction and in combinations and arrangements of parts, all as hereinafter more particularly described, and pointed out in the claims.

Figure 10:
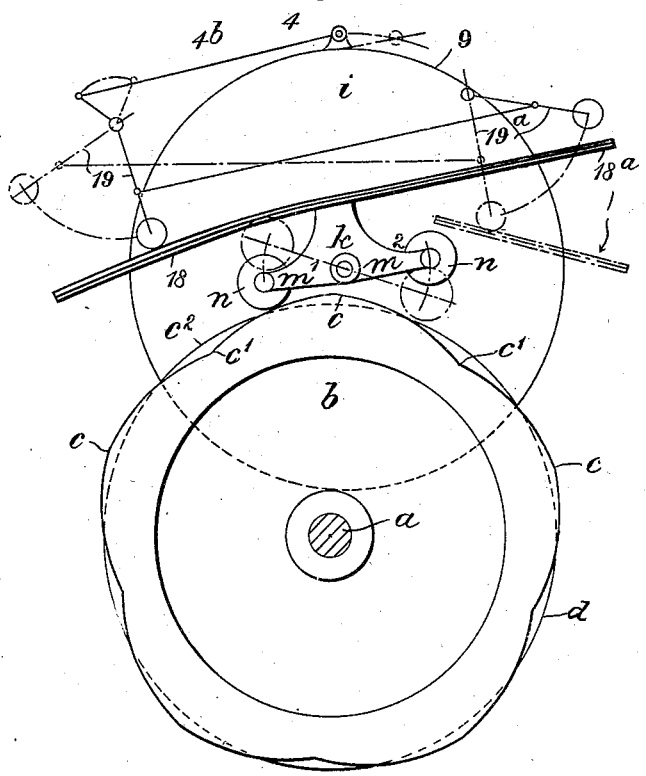

In the accompanying illustrative drawings, Figures 1 and 2 show one construction of driving or power-transmission mechanism embodying the present invention, Fig. 1 being a sectional elevation of the mechanism on the line A A of Fig. 2, and Fig. 2 a plan thereof with the upper part of the gear-casing removed. Figs. 3 and 4 are sections corresponding to the lines B B and C C, respectively, of Fig. 2. Fig. 5 shows in end elevation a reversible driving-clutch and attached parts, the end cover-plate of the clutch being removed and the clutch being in its mid or inoperative position. Fig. 5$^a$ is a detail view. Fig. 6 shows the clutch partly in vertical section on the line D D of Fig. 5 and partly in side elevation. Fig. 7 shows the rotary part of the clutch partly in side elevation and partly in longitudinal section. Fig. 8 shows in end elevation a portion of the clutch with the parts in position for driving in one direction; and Fig. 9 is a similar view to Fig. 8, showing the parts in the reverse position for driving in the opposite direction. Fig. 9$^a$ shows in end elevation a portion of the opposite side of the clutch with the means for preventing backward rotation of the driven body, this being a view of the parts as they appear at the rear of the parts shown in Fig. 9; and Fig. 10 is a diagram showing a modified arrangement of mechanism.

$a$ is a driving-shaft that may be the crank or equivalent shaft of an engine or be connected to such shaft.

$b$ is a driving-wheel of the kind hereinbefore described, mounted on the driving-shaft $a$ so as to turn therewith, but capable of being moved endwise thereon, its outer periphery being formed with variable-throw cam-surfaces in the form of ridges or projections $c$, that extend from a circular or cylindrical portion $d$ at one end of the wheel to the other end thereof.

$e$ is the driven shaft, adapted to be rotated through a roller-clutch comprising an outer oscillating part $f$ and an inner rotary part $g$, which is fixed to the driven shaft $e$ and is adapted to be rotated from the outer part $f$ through clutch-rollers $h$. The outer clutch part $f$ is fixed to a plate $i$, provided with a sleeve $k$, that is mounted to oscillate on the driven shaft $e$, and has fixed thereto a pair of lever-arms $m$, provided with anti-friction-wheels $n$, that are arranged to bear simultaneously against the periphery of the driving-wheel $b$. In the example the cam-like ridges or projections $c$ are of convex shape in section and incline in a lateral and outward direction from the plain circular portion $d$ of the wheel, the intermediate portions of the surface of the wheel being in the form of concave recesses or valleys $c'$, so that the surface of the wheel, except at the plain circular portion $d$ thereof, is of an undulating form, the ridges $c$ and valleys $c'$ being respectively of gradually-increasing height and depths as they proceed from the plain circular portion $d$, and the crests of the ridges $c$ and the bottoms of the valleys $c'$ at any given section of the wheel extending to equal extents from opposite sides of the pitch-circle $c^2$, which corresponds in diameter with the plain circular portion $d$. The distance between the points of contact $n'$ of the wheels $n$ with the periphery of the wheel $b$ is made equal, or approximately so, to one-half the pitch of the ridges $c$ or valleys $c'$, so that one wheel $n$ will bear against the crest of a ridge $c$ when the other wheel $n$ bears against the bottom of the next adjacent valley $c'$, and both wheels $n$ can bear simultaneously upon the plain circular portion $d$ of the wheel.

By the construction described the two wheels $n$ will remain in contact with the periphery of the driving-wheel $b$ when the wheel is moved into different positions along the driving-shaft $a$, the oscillating part $f$ of the clutch being positively actuated in each direction by the driving-wheel $b$ in all positions thereof except that in which the wheels $n$ are in contact with the plain portion $d$ of such wheel. In the example the driving-wheel $b$ is provided with five cam-like ridges $c$, with a corresponding number of intervening valleys $c'$; but the number of ridges and valleys can of course be varied to suit requirement. The ridges and valleys are, as shown, formed in a hardened-steel ring fixed on an inner core, and the wheels $n$ are also of hardened steel. To compensate for wear of these parts, the wheels $n$ may, as shown, be journaled in eccentric bearings $o$, that are capable of rotary adjustment in the lever-arms $m$ when desired. The driving-wheel $b$, which may form the fly-wheel of the engine used to rotate the driving-shaft $a$, is in the example arranged to be moved along the shaft $a$ by an arm $p$, that is adapted at one end to engage a grooved collar $q$, connected to one end of the driving-wheel $b$ and at the other end is adapted to engage after the manner of a nut a screw-threaded rod $r$, that is adapted to be rotated by hand or foot controlled mechanism. The other end of the driving-wheel $b$ is connected by a sleeve $s$ surrounding the shaft $a$ to a pinion $t$, that is adapted to be put into gear with a toothed wheel $u$, fast on the driven shaft $e$ after the speed of this shaft has been increased to full speed by increasing the stroke of the oscillating portion $f$ of the clutch to maximum stroke by bringing the parts of the cam-ridges $c$ of maximum throw into contact with the wheels $n$. After the toothed pinion $t$ and wheel $u$ have been engaged with each other the driving-wheel $b$ may be caused to pass out of driving connection with the wheels $n$ and arms $m$. In this case suitable means are provided to prevent the arms $m$ and wheels $n$ moving out of the proper working position for full speed when the wheel $b$ has passed out of driving connection with the wheels. For this purpose the plate $i$, connected to the sleeve $k$ and arms $m$, may be provided with a pin or projection $i'$, arranged to work between two fixed stops $i^2$, that are arranged at a distance apart equal to the maximum oscillation of the pin or projection $i'$ plus the angular width of such pin or projection.

The driving and driven shafts $a$ and $e$ are respectively mounted in bearings $v$ and $w$, carried by a support $x$, that may, as shown, conveniently be made as a closed casing containing the driving-wheel $b$, clutch and attached parts, the pinion $t$, and the wheel $u$, and to which the stops $i^2$ are fixed.

The oscillating portion $f$ of the clutch surrounds the rotary portion $g$ thereof and is formed around its inner periphery with a number of recesses 2, to form in conjunction with the outer periphery of the rotary portion $g$ the necessary receptacles for the clutch-rollers $h$, which are arranged to lock the two main portions of the clutch together when the oscillating portion $f$ is turned in one direction and to disconnect them when the oscillating portion is moved in the reverse direction in a manner well understood. The rotary part $g$ of the clutch is provided with means for preventing backward rotation thereof. For this purpose it is made of sufficient width, as shown in Figs. 6 and 7, to form a lateral annular extension $g'$, that is surrounded by a stationary ring 3, resembling the oscillating portion $f$ of the clutch in shape, and between which and the said ring are interposed clutch-rollers 4, herein called "detent-rollers," that will come into action to arrest the rotary part $g\,g'$ of the clutch should it attempt to turn in a backward direction.

To permit of the driven shaft $e$ being rotated in either direction from a driving-wheel $b$ rotating constantly in one direction, there are provided between the oscillating and rotary portions $f$ and $g$, respectively, of the clutch pairs of clutch-rollers $h\,h'$, one roller—say $h$—of each pair being arranged to connect the oscillating and rotating portions of the clutch together when the rotary portion $g$ of the clutch and the shaft $e$ are to be rotated in a forward direction, and the other roller—say $h'$—of each pair being arranged to act in like manner when the rotary portion of the clutch and attached parts are to be driven in a backward direction. The two rollers $h\,h'$ of each pair are pressed apart by a spring 5, preferably made as a double spring, (see Fig. 5$^a$,) and means are provided whereby one or other of the two rollers $h\,h'$ in each pair can be put out of action according to the desired direction of rotation. For this purpose the oscillating portion $f$ of the clutch may, according to the example shown, be formed with sets of radial slots 6 and 6$^a$ equal in number to the clutch-rollers $h\,h'$ and fitted, respectively, with radially-arranged slides 7 and 8, the inner ends 7ª or 8ª of each pair of which terminate in proximity to one of the rollers $h$ or $h'$ and are inclined on the side next the roller, and surrounding the oscillating clutch part $f$ is a ring 9, hereinafter called for distinction the "reversing-ring." This ring is formed on its inner periphery with recesses 10, that are equal in number to the pairs of rollers $h\ h'$, and each of which is formed with curved or inclined end walls 10ª, and between the recesses are plain curved portions 10ᵇ of less radius.

The reversing-ring 9 is provided with a starting and reversing lever 11, whereby it can be moved through a small angle to one side or the other of a central position, as indicated in Fig. 5. Means are provided for holding the lever in each of its three positions. For this purpose the lever 11 may be provided with a catch arranged to work over a stationary notched quadrant in a well-known manner or be suitably connected to a second reversing-lever with catch working over a notched segment and arranged to be conveniently operated by hand, as on a motor-car. The arrangement is such that when the starting and reversing lever 11 is moved into its mid-position 11ª (see Fig. 5) the reversing-ring 9 will be brought into a position in which each of the plain curved portions 10ᵇ thereof will be brought opposite the outer ends of the two sets of slides 7 and 8 for each pair of rollers $h\ h'$, so as to hold all the slides 7 8 in their inner position and the corresponding pairs of rollers $h\ h'$ in their inoperative position, the length of the said plain curved portions 10ᵇ being such that none of the sets of slides 7 or 8 will during the oscillating motion of the outer portion $f$ of the clutch be brought thereby opposite the recesses 10 in the reversing-ring 9, so that the said portion of the clutch will oscillate idly. When the starting and reversing lever 11 is moved from its mid or inoperative position 11ª to the forward position 11ᵇ, the reversing-ring 9 will be caused to turn relatively to the oscillating portion $f$ of the clutch into the position shown in Fig. 8, so that the slides 7 will be brought opposite the recesses 10 in such reversing-ring and allowed to move outward, so as to permit the rollers $h$ to come into action on the forward stroke of the oscillating part $f$ of the clutch for forward running, while the slides 8 will be still held in their inner positions by the portions 10ᵇ of the reversing-ring, so as to still hold the rollers $h'$ in the inoperative positions.

In Fig. 8 the oscillating portion $f$ of the clutch is shown at the end of its oscillation on the left. When the starting and reversing lever 11 is moved in the opposite direction into the position 11ᶜ for driving the shaft $e$ in a backward direction, the reversing-ring 9 will be also moved in the opposite direction to such an extent relatively to the oscillating portion $f$ of the clutch (see Fig. 9) as to bring its recesses 10 opposite the slides 8 that were previously held in the inner position, thereby enabling such slides to move outward and permit the corresponding set of rollers $h'$ to be forced into the operative position for backward running and to bring the plain curved portions 10ᵇ opposite the slides 7, so as to force these slides inward and cause their inner ends to move the rollers $h$ into the inoperative position and hold them in that position. The rollers $h$ or $h'$ may, as shown, be arranged to be clutched between the rotary part $g$ of the clutch and one or other end portion of the surface of the recesses 2 in the oscillating portion $f$ of the clutch, or they may be clutched between the rotary part $g$ of the clutch and the inner ends of the slides 7 or 8, which are then suitably lengthened and beveled to enable the clutch action to take place.

In a reversible clutch device such as described there are, as shown in Figs. 6 and 9ª, two sets of detent-rollers—viz., 4 4ª—for preventing reverse rotation of the rotary portion $g$ of the clutch, and the ring 3 for holding the said detent-rollers in place and which is fixed to the gear-case $x$ is provided with slots 12 and 12ª and slides 13 and 14, like the oscillating part $f$ of the clutch, and with a surrounding internally-recessed adjustable reversing-ring for causing one or other of the two sets of slides 13 or 14 to put one or other set of detent-rollers 4 or 4ª out of action, according to the desired direction of rotation of the rotary portion $g$ of the clutch. In the example the reversing-ring for the detent-rollers 4 4ª is formed by the reversing-ring 9, which is made of sufficient width to surround both the clutch-rollers $h\ h'$ and the detent-rollers 4 4ª.

The working of the apparatus hereinbefore described is as follows: Assuming the wheels $n$ of the clutch-operating mechanism to be in contact with the plain circular portion $d$ of the driving-wheel $b$, then upon this wheel being rotated by the driving-shaft $a$ no motion will be imparted to the clutch mechanism and shaft $e$; but upon moving the wheel $b$ along the driving-shaft $a$, so as to bring the wheels $n$ into contact with the undulating surface $c\ c'$ of the driving-wheel $b$, a rapid oscillating motion will be imparted to the lever-arms $m$ and the oscillating portion $f$ of the clutch whereby, if the starting and reversing lever be in either its forward or backward position a rapid intermittent circular motion will be imparted in one direction to the rotary part $g$ of the clutch and to the shaft $e$, the extent of oscillation, and consequently the speed of the shaft $e$, being gradually increased by moving the driving-wheel $b$ endwise, so as to bring parts of the cam-ridges $c$ of greater and greater throw into contact with the wheels $n$, and the extent of oscillation of the lever-arms and clutch part $f$, and consequently the speed of the shaft $e$, being gradually decreased by movement of the driving-wheel $b$ in the opposite direction, the oscillation of the said parts and the driving of the shaft $e$ from the wheel $b$ ceasing when the wheels $n$ come into contact with the plain portion $d$ of the driving-wheel, while leaving the clutch part $g$ and shaft $e$ free to run onward, if necessary, under the action of the momentum of the motor-car or other device driven from the said shaft $e$. If the starting and reversing lever 11 be moved into its mid-position while the engine is running, the rotary portion $g$ of the clutch and attached parts can be instantly put out of driving connection with the wheel $b$, although the oscillating portion $f$ of the clutch may continue to be oscillated thereby. Also, when the driving-wheel $b$ has been moved endwise, so as to bring the speed of the driven shaft $e$ up to full speed, the pinion $t$ can be caused to gear with the toothed wheel $v$, so as to enable the shaft $e$ to be continuously rotated from the shaft $a$ through the toothed pinion and wheel independently of the driving-wheel $b$ and clutch mechanism.

Sometimes instead of providing the clutch part $f$ with a two-arm clutch-operating lever $m$, both arms of which are arranged to be in contact simultaneously with the driving-wheel $b$, so that the oscillating part $f$ of the clutch will be driven in a positive manner in each direction from the driving-wheel, as hereinbefore described, it may in the case of a non-reversible clutch be provided with a single lever-arm that is arranged to be pressed into contact with the periphery of the driving-wheel by one or more springs or equivalent means, so that such lever-arm and the oscillating part of the clutch connected thereto will be moved in one direction by the cam-like ridges $c$ on the driving-wheel $b$ and in the opposite direction by the spring or springs or equivalent. When the clutch in such an arrangement is a reversible one, such as hereinbefore described, the oscillating part thereof may, as in the arrangement shown diagrammatically in Fig. 10, be connected to a two-arm lever $m'$ $m^2$, one arm of which—viz., $m'$—serves when pressed, as by a spring or springs against the driving-wheel $b$, preferably through an antifriction-wheel $n$, to cause the driving-wheel to drive the oscillating portion of the clutch in the proper direction to rotate the rotary part of the clutch in a forward direction, the other arm—say $m^2$—when pressed into driving connection with the driving-wheel serving to cause such wheel and the oscillating part of the clutch to drive the rotary portion of the clutch in a backward direction. In this case the reversing-ring 9 for the clutch-rollers $h$ $h'$ is stationary and the two arms $m'$ $m^2$ of the double-arm lever are arranged at such an angle to one another that in bringing one or other into the driving position the oscillating part of the clutch will be moved to such an extent relatively to the stationary reversing-ring 9 as to bring the proper set of clutch-rollers $h$ or $h'$ into action and put the other set out of action in the manner hereinbefore described with reference to Figs. 1 to 9, inclusive. The reversing-ring for the detent-rollers 4 $4^a$ is in this case separate from that for the clutch-rollers and is arranged to be partly rotated in one or other direction as required, when one or other of the lever-arms $m'$ $m^2$ is brought into position for use. For this purpose the said ring may be connected by any suitable mechanism $4^b$ to the means used for adjusting the two-arm clutch-operating lever $m'$ $m^2$.

The single-arm or two-arm clutch-operating lever, as the case may be, can be arranged to be actuated in various ways to bring it into the operative position or one or other of its operative positions. For this purpose there may be fixed to a lateral tubular extension or extensions of the boss of the single-arm lever a stiff laminated spring or pair of laminated springs that extends or extend in the same direction as the lever and against the back of which or each of which a pivoted arm or eccentric can be caused to bear by the operation of suitable hand-controlled mechanism. In the case of a two-armed leves, such as $m'$ $m^2$ (shown in Fig. 10) a double-ended laminated spring 18 $18^a$ or pair of springs and two connected pivoted arms 19 $19^a$ or sets of arms, or it may be eccentrics, may be used, the arrangement being such that by operating the said hand-controlled mechanism in one or other direction one or other of the pivoted arms 19 or $19^a$ or pair of arms or eccentrics will be brought into position to act upon one or other of the springs 18 or $18^a$ or pair of springs to move the two-armed lever $m'$ $m^2$ in one or other direction, the other pivoted arm or pair of arms or eccentrics moving into an inoperative position to release the corresponding spring or pair of springs. It is, however, considered that the arrangement shown in Figs. 1 to 9, inclusive, in which the oscillating part $f$ of the clutch is positively driven in each direction by the driving-wheel, is, especially when the driven shaft or body is to rotate at a high speed, preferable to those hereinbefore described, in which the said rotary part of the clutch is driven only in one direction by the driving-wheel and in the opposite direction by a spring or springs or equivalent.

Driving or power-transmission mechanism embodying the present invention can be constructed in various forms other than those shown and described and can be inclosed in a box or casing adapted to admit of its being readily attached to the chassis of a vehicle or other support and through which the driving and driven shafts $a$ and $e$ extend. As will be obvious, the details of construction can be variously modified.

What I claim is—

1. In driving or power-transmission mechanism, a rotary driving-body having a fixed axis of rotation and a peripheral driving-surface, clutch mechanism one portion of which is adapted to be oscillated by said driving-body through said driving-wheel and the other portion of which is adapted to be rotated in a step-by-step manner by said oscillating portion, and means for varying the extent of oscillation of said oscillating clutch portion by axial movement of said driving-body relatively to said clutch mechanism.

2. In driving or power-transmission mechanism, a rotary driving-body having a fixed axis of rotation and a peripheral driving-surface, clutch mechanism one portion of which is adapted to be oscillated by said driving-body and the other portion of which is adapted to be rotated in a step-by-step manner by said oscillating portion, and means for varying the extent of oscillation of said oscillating clutch portion and for arresting its oscillation, without stopping said driving-body, by axial movement of said body relatively to said clutch mechanism.

3. In driving or power-transmission mechanism, a rotary driving-body having a fixed axis of rotation and a peripheral driving-surface, reversible clutch mechanism one portion of which is adapted to be oscillated by said driving-body and the other portion of which is adapted to be rotated in a step-by-step manner in one direction or the other by said oscillating portion, and means for varying the extent of oscillation of said oscillating clutch portion by axial movement of said driving-body relatively to said clutch mechanism.

4. In driving or power-transmission mechanism, a rotary driving-body, clutch mechanism one portion of which is adapted to be oscillated by said driving-body and the other portion of which is adapted to be rotated in a step-by-step manner by said oscillating portion, a driven body connected to said rotating clutch portion, means for varying the extent of oscillation of said oscillating clutch portion and thereby varying the speed imparted to said driven body without varying the speed of said driving-body, and means for directly connecting said driving and driven bodies when full speed is attained.

5. In driving or power-transmission mechanism, a rotary driving-body arranged to continuously rotate in one direction, reversible clutch mechanism one portion of which is adapted to be oscillated by said driving-body and the other portion of which is adapted to be rotated in a step-by-step manner in one direction or the other by said oscillating portion, a driven body connected to said rotary clutch portion, means for varying the extent of oscillation of said oscillating clutch portion and thereby varying the speed imparted to said driven body in either direction without varying the speed of said driving-body, and means for directly connecting said driving and driven bodies when full speed is attained in one direction.

6. In driving or power-transmission mechanism, a driving-body, a rotary driving-cam constantly concentric with said driving-body, a lever-arm arranged to be oscillated by said driving-cam, clutch mechanism one portion of which is adapted to be oscillated by said lever-arm and the other portion of which is adapted to be rotated in a step-by-step manner by said oscillating portion, a driven body connected to said rotary clutch portion, and means for varying the extent of oscillation of said lever-arm by said cam.

7. In driving or power-transmission mechanism, a driving-body, a rotary variable-throw driving-cam constantly concentric with the driving-body, a lever-arm arranged to be oscillated by said driving-cam, clutch mechanism one portion of which is adapted to be oscillated by said lever-arm and the other portion of which is adapted to be rotated in a step-by-step manner by said oscillating portion, a driven body connected to said rotary clutch portion, and means for displacing said cam and lever-arm relatively to each other in an endwise direction and thereby varying the extent of oscillation of said lever-arm.

8. In driving or power-transmission mechanism, a rotary driving-body having a variable-throw cam-surface formed upon its periphery, a lever-arm arranged to be oscillated thereby, clutch mechanism one portion of which is adapted to be oscillated by said lever-arm and the other portion of which is adapted to be rotated in a step-by-step manner by said oscillating portion, a driven body connected to said rotary clutch portion, and means for displacing said driving-body and lever-arm relatively to each other and thereby varying the extent of oscillation of said lever-arm.

9. In driving or power-transmission mechanism, a rotary driving-body having a plurality of variable-throw cam-surfaces formed upon its periphery, a lever-arm arranged to be oscillated thereby, clutch mechanism one portion of which is adapted to be oscillated by said lever-arm and the other portion of which is adapted to be rotated in a step-by-step manner by said oscillating portion, a driven body connected to said rotary clutch portion and means for displacing said driving-body and lever-arm relatively to each other and thereby varying the extent of oscillation of said lever-arm.

10. In driving or power-transmission mechanism, a rotary driving-body having a plurality of variable-throw cam-surfaces extending round its periphery and a cylindrical portion at one side, a lever-arm arranged to be oscillated thereby, clutch mechanism one portion of which is adapted to be oscillated by said lever-arm and the other portion of which is adapted to be rotated in a step-by-step manner by said oscillating portion, a driven body connected to said rotary clutch portion, and means for displacing said driving-body and lever-arm relatively to each other and thereby varying the extent of oscillation of said lever-arm or arresting such oscillation without stopping the rotation of said driving-body.

11. In driving or power-transmission mechanism, an axially-movable rotary driving-body having a plurality of variable-throw cam-surfaces upon its periphery, a lever-arm arranged to be oscillated thereby, clutch mechanism one portion of which is adapted to be oscillated by said lever-arm and the other portion of which is adapted to be rotated in a step-by-step manner by said oscillating portion, a driven body connected to said rotary clutch portion, and means for moving said driving-body axially whereby the oscillating lever-arm can be caused to bear upon portions of its periphery of different throw.

12. In driving or power-transmission mechanism, an axially-movable rotary driving-body having a plurality of variable-throw cam-surfaces extending round its periphery and a cylindrical portion at one side, a lever-arm arranged to be oscillated thereby, clutch mechanism one portion of which is adapted to be oscillated by said lever-arm and the other portion of which is adapted to be rotated in a step-by-step manner by said oscillating portion, a driven body connected to said rotary clutch portion and means for moving said driving-body axially whereby the oscillating lever-arm can be caused to bear upon portions of its periphery of different throw or upon said cylindrical portion.

13. In driving or power-transmission mechanism, an axially-movable rotary driving-body having a plurality of variable-throw cam-surfaces upon its periphery, a lever-arm arranged to be oscillated thereby, clutch mechanism one portion of which is adapted to be oscillated by said lever-arm and the other portion of which is adapted to be rotated in a step-by-step manner by said oscillating portion, a driven body connected to said rotary clutch portion means for moving said driving-body axially so that the oscillating lever-arm can be caused to bear upon different portions of its periphery and the extent of oscillation of said lever-arm thereby varied, and means whereby said driving-body can, after being moved axially into one of its extreme end positions and said oscillating lever-arm moved out of contact therewith, be directly connected with said driven body.

14. In driving or power-transmission mechanism, an axially-movable rotary driving-body having a plurality of variable-throw cam-surfaces extending round its periphery, and a cylindrical portion at one side, a lever-arm arranged to be oscillated thereby, clutch mechanism one portion of which is adapted to be oscillated by said lever-arm and the other portion of which is adapted to be rotated in a step-by-step manner by said oscillating portion, a driven body connected to said rotary clutch portion, means for moving said driving-body axially so that the oscillating lever-arm can be caused to bear upon different portions of its periphery, of the variable-throw cam-surfaces or upon the cylindrical portion, and means whereby said driving-body can, after being moved axially into one of its extreme end positions and said oscillating lever-arm moved out of contact therewith, be directly connected with said driven body.

15. In driving or power-transmission mechanism, a rotary driving-cam, a double-armed oscillating lever operated thereby, clutch mechanism one portion of which is adapted to be oscillated by said double-armed lever and the other portion of which is adapted to be rotated in a step-by-step manner by said oscillating portion, a driven body connected to said rotating clutch portion, and means for varying the extent of oscillation of said double-armed lever.

16. In driving or power-transmission mechanism, a rotary variable-throw driving-cam, a double-armed oscillating lever operated thereby, clutch mechanism one portion of which is adapted to be oscillated by said double-armed lever and the other portion of which is adapted to be rotated in a step-by-step manner by said oscillating portion, a driven body connected to said rotating clutch portion, and means for displacing said cam and double-arm lever relatively to each other and thereby varying the extent of oscillation of said double-armed lever.

17. In driving or power-transmission mechanism, a rotary driving-body having a variable-throw cam-surface formed upon its periphery, a double-armed oscillating lever operated thereby, clutch mechanism one portion of which is adapted to be oscillated by said double-armed lever and the other portion of which is adapted to be rotated in a step-by-step manner by said oscillating portion, a driven body connected to said rotating clutch portion, and means for displacing said driving-body and double-armed lever relatively to each other for varying the extent of oscillation of said double-armed lever.

18. In driving or power-transmission mechanism, a rotary driving-body having a plurality of variable-throw cam-surfaces formed upon its periphery, a double-armed oscillating lever operated thereby, clutch mechanism one portion of which is adapted to be oscillated by said double-armed lever and the other portion of which is adapted to be rotated in a step-by-step manner by said oscillating portion, a driven body connected to said rotating clutch portion, and means for displacing said driving-body and double-armed lever relatively to each other for varying the extent of oscillation of said double-armed lever.

19. In driving or power-transmission mechanism, a rotary driving-body having a plurality of variable-throw cam-surfaces extending round its periphery and a cylindrical portion at one side, a double-armed oscillating lever operated thereby, clutch mechanism one portion of which is adapted to be oscillated by said double-armed lever and the other portion of which is adapted to be rotated in a step-by-step manner by said oscillating portion, a driven body connected to said rotating clutch portion, and means for displacing said driving-body and double-armed lever relatively to each other for varying the extent of oscillation of said double-armed lever or for arresting such oscillation without stopping the rotation of said driving-body.

20. In driving or power-transmission mechanism, an axially-movable rotary driving-body having a plurality of variable-throw cam-surfaces upon its periphery, a double-armed oscillating lever operated thereby, clutch mechanism one portion of which is adapted to be oscillated by said double-armed lever and the other portion of which is adapted to be rotated in a step-by-step manner by said oscillating portion, a driven body connected to said rotating clutch portion, and means for moving said driving-body axially so that the lever can be caused to bear upon different portions of its periphery and the extent of oscillation of said lever thereby varied.

21. In driving or power-transmission mechanism, an axially-movable rotary driving-body having a plurality of variable-throw cam-surfaces extending round its periphery and a cylindrical portion at one side, a double-armed oscillating lever operated thereby, clutch mechanism one portion of which is adapted to be oscillated by said double-armed lever and the other portion of which is adapted to be rotated in a step-by-step manner by said oscillating portion, a driven body connected to said rotating clutch portion, and means for moving said driving-body axially so that the lever can be caused to bear upon different portions of its periphery and the extent of oscillation of said lever thereby varied or said lever can be caused to bear upon the said cylindrical portion and its oscillation arrested.

22. In driving or power-transmission mechanism, an axially-movable rotary driving-body having a plurality of variable-throw cam-surfaces upon its periphery, a double-armed oscillating lever operated thereby, clutch mechanism one portion of which is adapted to be oscillated by said double-armed lever and the other portion of which is adapted to be rotated in a step-by-step manner by said oscillating portion, a driven body connected to said rotating clutch portion, means for moving said driving-body axially so that said lever can be caused to bear upon different portions of said cam-surfaces and means whereby when said driving-body has been moved axially into one of its extreme positions and said lever moved out of contact with said driving-body said driving-body can be directly connected to the said driven body.

23. In driving or power-transmission mechanism, an axially-movable rotary driving-body having a plurality of variable-throw cam-surfaces extending round its periphery and a cylindrical portion at one side, a double-armed oscillating lever operated thereby, clutch mechanism one portion of which is adapted to be oscillated by said double-armed lever and the other portion of which is adapted to be rotated in a step-by-step manner by said oscillating portion, a driven body connected to said rotating clutch portion, means for moving said driving-body axially so that said lever can be caused to bear upon different portions of said cam-surfaces or upon cylindrical portions of said driving-body, and means whereby when said driving-body has been moved axially into one of its extreme positions and said lever moved out of contact with said driving-body said driving-body can be directly connected to the said driven body.

24. Driving or power-transmission mechanism comprising a rotary driving-shaft, a driving-wheel mounted upon said shaft so as to rotate therewith and axially movable thereon, said driving-wheel having variable-throw cam-surfaces upon its periphery, a double-armed oscillating lever bearing upon the periphery of said driving-wheel, means for moving said driving-wheel axially with reference to said lever, an oscillating clutch portion connected to said lever, a rotary clutch portion, means for connecting the oscillating clutch portion with the rotary clutch portion when said oscillating clutch portion moves in one direction and for disconnecting said portions when said oscillating clutch portion moves in the opposite direction, and a driven body connected to said rotary clutch portion.

25. Driving or power-transmission mechanism comprising a rotary driving-shaft, a driving-wheel mounted upon said shaft so as to rotate therewith and axially movable thereon, said driving-wheel having variable-throw cam-surfaces upon its periphery, and with a cylindrical portion at one side, a double-armed oscillating lever bearing upon the periphery of said driving-wheel, means for moving said driving-wheel axially with reference to said lever, an oscillating clutch portion connected to said lever, a rotary clutch portion, means for connecting the oscillating clutch portion with the rotary clutch portion when said oscillating clutch portion moves in one direction and for disconecting said portions when said oscillating clutch portion moves in the opposite direction, and a driven body connected to said rotary clutch portion.

26. Driving or power-transmission mechanism comprising a rotary driving-shaft, a driving-wheel mounted upon said shaft so as to rotate therewith and axially movable thereon, said driving-wheel having variable-throw cam-surfaces upon its periphery, a double-armed oscillating lever bearing upon the periphery of said driving-wheel, means for moving said driving-wheel axially with reference to said lever, an oscillating clutch-ring connected to said lever, a rotary clutch portion located within said oscillating clutch-ring so as to be surrounded thereby, clutching devices for connecting said oscillating clutch-ring and rotating clutch portion when said oscillating clutch-ring moves in one direction and for releasing said parts when said clutch-ring moves in the other direction, means for preventing backward movement of said rotary clutch portion, and a driven body connected to said rotating clutch portion.

27. Driving or power-transmission mechanism comprising a rotary driving-shaft, a driving-wheel mounted upon said shaft so as to rotate therewith and axially movable thereon, said driving-wheel having variable-throw cam-surfaces upon its periphery, a double-armed oscillating lever bearing upon the periphery of said driving-wheel, means for moving said driving-wheel axially with reference to said lever, an oscillating clutch-ring connected to said lever, a rotary clutch portion located within said oscillating clutch-ring so as to be surrounded thereby, clutching devices for connecting said oscillating clutch-ring and rotating clutch portion when said oscillating clutch-ring moves in one direction and for releasing said parts when said clutch-ring moves in the other direction, means for preventing backward movement of said rotary clutch portion, a driven body connected to said rotating clutch portion and means for directly connecting said rotary driving-shaft to said driven body when said driving-wheel has been moved to one of its extreme positions, substantially as set forth.

28. Driving or power-transmission mechanism comprising a rotary driving-shaft, a driving-wheel mounted upon said shaft so as to rotate therewith and axially movable thereon, said driving-wheel having variable-throw cam-surfaces upon its periphery, a double-armed oscillating lever bearing upon the periphery of said driving-wheel, means for moving said driving-wheel axially with reference to said lever, an oscillating clutch-ring connected to said lever, a rotary clutch portion located within said oscillating clutch-ring so as to be surrounded thereby, clutching devices for connecting said oscillating clutch-ring and rotating clutch portion when said oscillating clutch-ring moves in one direction and for releasing said parts when said clutch-ring moves in the other direction, a stationary ring corresponding to said oscillating ring and adapted to surround said rotary clutch portion, detent devices between said stationary ring and said rotary clutch portion whereby said rotary clutch portion is prevented from moving backwardly and a driven body connected to said rotary clutch portion.

29. Driving or power-transmission mechanism comprising a rotary driving-shaft, a driving-wheel mounted upon said shaft so as to rotate therewith and axially movable thereon, said driving-wheel having variable-throw cam-surfaces upon its periphery, and with a cylindrical portion at one side, a double-armed oscillating lever bearing upon the periphery of said driving-wheel, means for moving said driving-wheel axially with reference to said lever, an oscillating clutch-ring connected to said lever, a rotary clutch portion located within said oscillating clutch-ring so as to be surrounded thereby, clutching devices for connecting said oscillating clutch-ring and rotating clutch portion when said oscillating clutch-ring moves in one direction and for releasing said parts when said clutch-ring moves in the other direction, a stationary ring corresponding to said oscillating ring and adapted to surround said rotary clutch portion, detent devices between said stationary ring and said rotary clutch portion whereby said rotary clutch portion is prevented from moving backwardly, and a driven body connected to said rotary clutch portion.

30. Driving or power-transmission mechanism comprising a driving-shaft, a driving-wheel mounted to move axially thereon and to rotate therewith, said driving-wheel having variable-throw cam-surfaces upon its periphery, a double-armed oscillating lever bearing upon the periphery of said driving-wheel, means for moving said driving-wheel axially with reference to said lever, an oscillating clutch-ring connected to said lever, a rotating clutch portion, located within said oscillating clutch-ring so as to be surrounded thereby, reversible clutching devices for connecting said oscillating clutch-ring and rotating clutch portion when said oscillating clutch-ring is moved in a forward or backward direction and for releasing them when said clutch-ring is moved in a backward or forward direction, reversible detent devices for preventing backward movement of said rotating clutch portion and a driven body connected to said rotating clutch portion.

31. Driving or power-transmission mechanism comprising a driving-shaft, a driving-wheel mounted to move axially thereon and to rotate therewith, said driving-wheel having variable-throw cam-surfaces upon its periphery, and with a cylindrical portion at one side, a double-armed oscillating lever bearing upon the periphery of said driving-wheel, means for moving said driving-wheel axially with reference to said lever, an oscillating clutch-ring connected to said lever, a rotating clutch portion, located within said oscillating clutch-ring so as to be surrounded thereby, reversible clutching devices for connecting said oscillating clutch-ring and rotating clutch portion when said oscillating clutch-ring is moved in a forward or backward direction and for releasing them when said clutch-ring is moved in a backward or forward direction, reversible detent devices for preventing backward movement of said rotating clutch portion and a driven body connected to said rotating clutch portion.

32. Driving or power-transmission mechanism comprising a driving-shaft, a driving-wheel mounted to move axially thereon and to rotate therewith, said driving-wheel having variable-throw cam-surfaces upon its periphery, a double-armed oscillating lever bearing upon the periphery of said driving-wheel, means for moving said driving-wheel axially with reference to said lever, an oscillating clutch-ring connected to said lever, a rotating clutch portion, located within said oscillating clutch-ring so as to be surrounded thereby, a driven body connected to said rotating clutch portion, two sets of clutching devices for connecting said oscillating clutch-ring and rotary clutch portions when said oscillating clutch-ring is oscillated in a forward or backward direction and for releasing them when said clutch-ring is oscillated in a backward or forward direction, one of said sets of clutching devices operating for each direction, a stationary detent-ring similar to the oscillating clutch-ring and also surrounding said rotary clutch portion, two sets of detent devices between said stationary detent-ring and said rotating clutch portion for preventing said rotating clutch portion from moving in the direction that is not required, and a reversing-ring surrounding said oscillating clutch and stationary detent-rings and adapted according to its position to cause the operation of one set of clutching and detent devices, the other set of clutching and detent devices being placed out of operation according to the desired direction of rotation, all of the clutching and detent devices being disengaged when the reversing-ring occupies a mid-position.

33. Driving or power-transmission mechanism comprising a driving-shaft, a driving-wheel mounted to move axially thereon and to rotate therewith, said driving-wheel having variable-throw cam-surfaces upon its periphery, a double-armed oscillating lever bearing upon the periphery of said driving-wheel, means for moving said driving-wheel axially with reference to said lever, an oscillating clutch-ring connected to said lever, a rotating clutch portion, located within said oscillating clutch-ring so as to be surrounded thereby, a driven body connected to said rotating clutch portion, two sets of clutching devices for connecting said oscillating clutch-ring and rotary clutch portions when said oscillating clutch-ring is oscillated in a forward or backward direction and for releasing them when said clutch-ring is oscillated in a backward or forward direction, one of said sets of clutching devices operating for each direction, a stationary detent-ring similar to the oscillating clutch-ring and also surrounding said rotary clutch portion, two sets of detent devices between said stationary detent-ring and said rotating clutch portion for preventing said rotating clutch portion from moving in the direction that is not required, a reversing-ring surrounding said oscillating clutch and stationary detent-rings and adapted according to its position to cause the operation of one set of clutching and detent devices, the other set of clutching and detent devices being placed out of operation according to the desired direction of rotation, all of the clutching and detent devices being disengaged when the reversing-ring occupies a mid-position and means for directly connecting said rotary driving-shaft to said driven body when said driving-wheel has been moved to one of its extreme positions.

34. Driving or power-transmission mechanism comprising a driving-shaft, a driving-wheel mounted to move axially thereon and to rotate therewith, said driving-wheel having variable-throw cam-surfaces upon its periphery, and with a cylindrical portion at one side, a double-armed oscillating lever bearing upon the periphery of said driving-wheel, means for moving said driving-wheel axially with reference to said lever, an oscillating clutch-ring connected to said lever, a rotating clutch portion, located within said oscillating clutch-ring so as to be surrounded thereby, a driven body connected to said rotary clutch portion, two sets of clutching devices for connecting said oscillating clutch-ring and rotary clutch portions when said oscillating clutch-ring is oscillated in a forward or backward direction and for releasing them when said clutch-ring is oscillated in a backward or forward direction, one of said sets of clutching devices operating for each direction, a stationary detent-ring similar to the oscillating clutch-ring and also surrounding said rotary clutch portion, two sets of detent devices between said stationary detent-ring and said rotating clutch portion for preventing said rotating clutch portion from moving in the direction that is not required, a reversing-ring surrounding said oscillating clutch and stationary detent-rings and adapted according to its position to cause the operation of one set of clutching and detent devices, the other set of clutching and detent devices being placed out of operation according to the desired direction of rotation, all of the clutching and detent devices being disengaged when the reversing-ring occupies a mid-position, and means for directly connecting said rotary driving-shaft to said driven body when said driving-wheel has been moved to one of its extreme positions.

35. In driving or power-transmission mechanism, the combination with a driving-body, a driven body, and a rotary clutch of an axially-movable driving-wheel provided with cam-like surfaces and adapted to impart intermittent motion to said clutch through an oscillating two-armed lever adapted to constantly bear against the surface of said driving-wheel, substantially as described and shown.

36. In driving or power-transmission mechanism, a reversible clutch comprising a rotary clutch portion, an oscillating clutch-ring, two sets of clutch devices for connecting said parts together, and a reversing-ring surrounding the oscillating clutch-ring and adapted to bring one or other set of clutch devices into operation or to put both of them out of operation, substantially as described and shown.

Signed at Sheffield, England, this 28th day of December, 1905.

ROBERT HAMILTON.

Witnesses:
   Luther J. Parr,
   Chas. N. Daniels.